(12) United States Patent
Wilczynski et al.

(10) Patent No.: US 12,450,208 B2
(45) Date of Patent: Oct. 21, 2025

(54) UNIFIED DATA MODEL AND INTERFACE FOR DATABASES STORING DISPARATE TYPES OF DATA

(71) Applicant: Palantir Technologies Inc., Denver, CO (US)

(72) Inventors: Peter Wilczynski, San Francisco, CA (US); Sharon Hao, Redwood City, CA (US); Will Deuschle, Orchard Park, NY (US); Ernest Zeidman, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 73 days.

(21) Appl. No.: 17/955,472

(22) Filed: Sep. 28, 2022

(65) Prior Publication Data

US 2023/0015068 A1    Jan. 19, 2023

Related U.S. Application Data

(63) Continuation of application No. 16/138,754, filed on Sep. 21, 2018, now Pat. No. 11,487,720.
(Continued)

(51) Int. Cl.
*G06F 16/21* (2019.01)
*G06F 16/248* (2019.01)
*G06F 16/28* (2019.01)

(52) U.S. Cl.
CPC .......... *G06F 16/212* (2019.01); *G06F 16/248* (2019.01); *G06F 16/288* (2019.01)

(58) Field of Classification Search
None
See application file for complete search history.

(56) References Cited

U.S. PATENT DOCUMENTS 8,332,084 B1 * 12/2012 Bailey .................. G05D 1/0204
                                                           701/4
9,348,880 B1    5/2016 Kramer
(Continued)

FOREIGN PATENT DOCUMENTS

EP         2863326         4/2015

OTHER PUBLICATIONS

NPL—Mahmoodresearch, Mahmood et al., "Building Spatio-Temporal Database Model Based on Ontological Approach using Relational Database Environment", Mehran University Research Journal of Engineering and Technology, 2017, 36 (4), pp. 891-900. ffhal-01700630 (Year: 2017).*
(Continued)

*Primary Examiner* — Aleksandr Kerzhner
*Assistant Examiner* — Anugeetha Kunjithapatham
(74) *Attorney, Agent, or Firm* — Sheppard Mullin Richter & Hampton LLP

(57) ABSTRACT

Systems, methods, and non-transitory computer readable media may be configured to access first database and a second database. The first database may be structured for a first data type, and may include a first data of the first data type. The second database may be structured for a second data type different from the first datatype, and may include a second data of the second data type. The second data may be associated with the first data. A first information request relating to the first data and a second information request relating to the second data may be received. A first response to the first information request may be determined based on the second data. A second response to the second information request may be determined based on the first data. An interface, through which the first response or the second response is accessible, may be provided.

16 Claims, 6 Drawing Sheets

Related U.S. Application Data

(60) Provisional application No. 62/668,675, filed on May 8, 2018.

(56) References Cited

U.S. PATENT DOCUMENTS

| | | | |
|---|---|---|---|
| 9,922,108 | B1 | 3/2018 | Meiklejohn et al. |
| 2007/0178501 | A1 | 8/2007 | Rabinowitz et al. |
| 2009/0083032 | A1 | 3/2009 | Jablokov et al. |
| 2010/0070448 | A1 | 3/2010 | Omoigui |
| 2010/0332210 | A1 | 12/2010 | Birdwell et al. |
| 2012/0115505 | A1* | 5/2012 | Miyake ............... H04W 4/027 455/456.1 |
| 2013/0091170 | A1 | 4/2013 | Zhang et al. |
| 2013/0173664 | A1 | 7/2013 | Xue et al. |
| 2013/0214925 | A1* | 8/2013 | Weiss ............... G08B 25/016 340/539.11 |
| 2013/0238235 | A1* | 9/2013 | Kitchel ............... G01S 19/19 701/445 |
| 2013/0262510 | A1 | 10/2013 | Smith et al. |
| 2014/0045530 | A1 | 2/2014 | Gordon et al. |
| 2014/0116776 | A1* | 5/2014 | Marx ............... E21B 12/02 706/11 |
| 2014/0236482 | A1* | 8/2014 | Dorum ............... G01C 21/3844 701/400 |
| 2014/0244125 | A1* | 8/2014 | Dorum ............... B60W 40/109 701/1 |
| 2014/0361899 | A1 | 12/2014 | Layson |
| 2015/0011242 | A1* | 1/2015 | Nagaraj ............... H04W 64/006 455/456.2 |
| 2015/0039600 | A1 | 2/2015 | Walters et al. |
| 2015/0363494 | A1 | 12/2015 | Norman |
| 2016/0070758 | A1 | 3/2016 | Thomson et al. |
| 2016/0328418 | A1 | 11/2016 | Shimazawa |
| 2017/0052761 | A1* | 2/2017 | Gunshor ............... G06Q 50/01 |
| 2017/0094490 | A1 | 3/2017 | Ryan et al. |
| 2017/0201527 | A1 | 7/2017 | Bedi |
| 2017/0220807 | A1 | 8/2017 | Munoz et al. |
| 2017/0293652 | A1 | 10/2017 | Kevorkian |
| 2017/0357903 | A1 | 12/2017 | Pal et al. |
| 2018/0053401 | A1 | 2/2018 | Martin et al. |
| 2018/0152527 | A1 | 5/2018 | Enoki et al. |
| 2018/0189340 | A1 | 7/2018 | Rhyne et al. |
| 2018/0196863 | A1 | 7/2018 | Meiklejohn et al. |
| 2018/0231653 | A1 | 8/2018 | Pradeep et al. |

OTHER PUBLICATIONS

Karasuyama et. al., "Multiple Incremental Decremental Learning of Support Vector Machines", IEEE Transactions on Neural Networks vol. 21, No. 7, pp. 1048-1059, Jul. 2010 (Year: 2010).

Long, A. Jed, "Kinematic interpolation of movement data", Article in International Journal of Geographical Information Science, Sep. 2015 (Year: 2015).

Cheng, "You Are Where You Tweet: A Content-Based Approach to Geo-locating Twitter Users", CIKM'10, Oct. 2010 (Year: 2010).

Chronix: Adrian Colyer, "Chronix: Long term storage and retrieval technology for anomaly detection in operational data", Mar. 2017, accessible from <https://blog.acolyer.org/2017/03/10/chronix-long-term-storage-and-retrieval-technology-for-anomaly-detection-in-operational-data/> (Year: 2017).

Notice of Allowance for U.S. Appl. No. 15/398,958 dated Nov. 9, 2017.

Notice of Allowance for U.S. Appl. No. 15/474,719 dated Dec. 31, 2018.

Official Communication for U.S. Appl. No. 15/398,958 dated Jul. 31, 2017.

Official Communication for U.S. Appl. No. 15/474,719 dated Aug. 25, 2017.

* cited by examiner

UNIFIED DATA MODEL AND INTERFACE FOR DATABASES STORING DISPARATE TYPES OF DATA

CROSS REFERENCE TO RELATED APPLICATIONS

This application is a continuation of U.S. patent application Ser. No. 16/138,754, filed Sep. 21, 2018, which claims the benefit under 35 U.S.C. § 119(e) of U.S. Provisional Application Ser. No. 62/668,675, filed May 8, 2018. The entire contents of all of the above-identified applications are incorporated herein by reference.

FIELD OF THE INVENTION

This disclosure relates to approaches for providing a unified data model for databases.

BACKGROUND

Under conventional approaches, a database may be structured and/or optimized for a particular type of data. Storage of other types of data in such a database may strain the database and/or a system using the database.

SUMMARY

Various embodiments of the present disclosure may include systems, methods, and non-transitory computer readable media configured to provide a unified data model for databases. A first database and a second database may be accessed. The first database may be structured for a first data type. The first database may include a first data of the first data type. The second database may be structured for a second data type different from the first datatype. The second database may include a second data of the second data type. The second data may be associated with the first data. A first information request relating to the first data and a second information request relating to the second data may be received. A first response to the first information request may be determined based on the second data. A second response to the second information request may be determined based on the first data. An interface, through which the first response or the second response is accessible, may be provided.

In some embodiments, the first database may include an object database and the second database include a high-scale time series database. For example, the first data of the first database may represent an entity and the second data of the second database may represent geo-temporal information associated with the entity. The high-scale time series database may be used for data transformation and data enrichment.

In some embodiments, the object database may include objects representing entities and links between the objects that represent connections between the entities. The connections between the entities may include at least one of: a user-defined connection and a suggested connection.

In some embodiments, the interface may provide a merged view of the first data and the second data.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
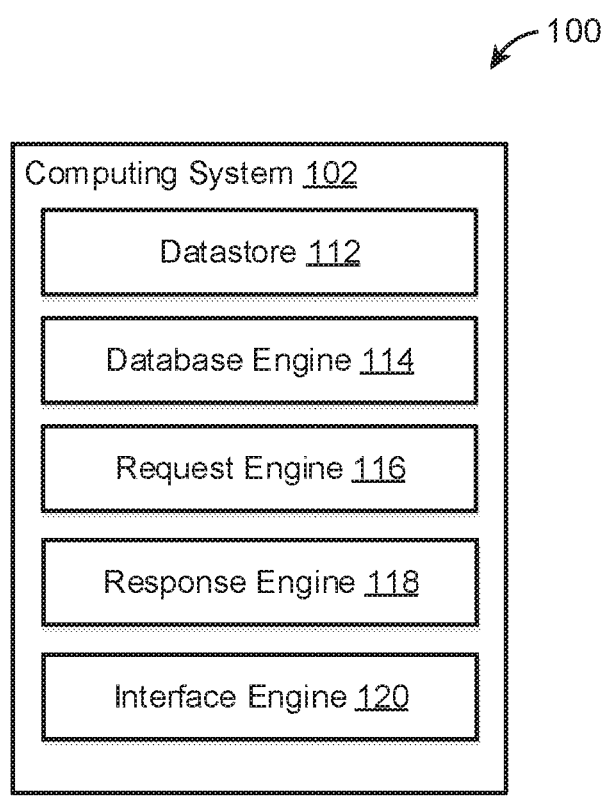
FIG. 1 illustrates an example environment for providing a unified data model for databases, in accordance with various embodiments.

A claimed solution rooted in computer technology overcomes problems specifically arising in the realm of computer technology. In various implementations, a computing system may access a first database and a second database. The first database may be structured for a first data type and the second database may be structured for a second data type different from the first data type. The first database may include a first data of the first data type and the second database may include a second data of the second data type. Data included in the first database and data included in the second database may be tightly integrated such that information request/flow may move from data in one database to data in another database. For example, the second data in the second database may be associated with the first data in the first database such that responsive to receiving a first information request relating to the first data, the computing system may determine a first response based on the second data, and responsive to receiving a second information request relating to the second data, the computing system may determine a second response based on the first data. The computing system may provide an interface through which the first response or the second response are accessible.

The interface may provide a merged view of the first data and the second data. Such an interface may facilitate similar treatment of different types of data. For instance, the interface may provide a merged view of different types of geo-temporal data (e.g., cellular tower pings for a mobile device of an entity, physical observations of entity locations, projected locations of an entity) using the same type of tool(s), which may provide a consistent user interface that fuses different descriptive data of different sources for an entity at the application level. For example, data from different data sources may be merged into the same temporal data format for performing operations.

In some embodiments, the first database may include data stored as objects (e.g., object database) and the second database may include a high-scale time series database. For example, the first data in the first database may represent an entity and the second data in the second database may represent geo-temporal information associated with the entity. The first database may store data representing other low-scale, high-level objects and the second database may store data representing other high-scale, low-level objects.

The object database may include objects representing entities (e.g., persons, things, events, documents). The object database may include links between objects that represent connections between the entities. Connections may include user-defined connections and/or suggested connections. For example, a machine learning tool (or model) may receive data from the high-scale time series database to identify potential connections between objects in the object database. These potential connections may be suggested to a user for investigation. The user's confirmation/rejection of the suggested connections may be fed back into the machine learning tool to update and refine the machine learning tool. In some implementations, the high-scale time series database may be used for data transformation and data enrichment. For instance, data in the high-scale time series database may be modified using transformations/pipeline tools. Data in the high-scale time series database may be used to enrich an object in the object database.

The approaches disclosed herein provide a unified data model for different databases. For instance, data stored in disparate databases (e.g., defined by different ontologies) may be integrated such that application layer is able to treat different data (e.g., data generated and/or stored differently) similarly. For example, an application programming interface may include connections between low-scale entity data and high scale temporal data that allows for processing of temporal operations (e.g., determining information requests relating to temporal characteristics of entities) more efficiently.

FIG. 1 illustrates an example environment 100 for providing a unified data model for databases, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a database engine 114, a request engine 116, a response engine 118, an interface engine 120, and/or other engines/components. The datastore 112 may include structured and/or unstructured sets of data that can be divided/extracted for provisioning when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple, distributed computing devices and/or systems.

In various embodiments, the database engine 114 may be configured to access multiple databases. Accessing a database may include acquiring, analyzing, determining, examining, identifying, loading, locating, obtaining, opening, receiving, retrieving, reviewing, storing, using, and/or otherwise accessing the database. Accessing a database may include accessing the entire database and/or accessing one or more portions of the database. Multiple databases may be accessed at the same time or at different times by the database engine 114. A database may be accessed from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). One or more databases accessed by the database engine 114 may be stored within the datastore 112 and/or other locations.

Databases accessed by the database engine 114 may include disparate databases. Disparate databases may refer to databases that are different in kind and/or databases that do not allow for comparison of data stored within the disparate databases. Disparate databases may utilize different ontologies. That is, data may be stored within disparate databases using different ontologies that are not compatible with each other. For example, databases accessed by the database engine 114 may be structured for different types of data. Different types of data may be defined by different ontologies. For instance, the database engine 114 may access a first database and a second database. The first database may be structured for a first data type and the second database may be structured for a second data type, where the second data type is different from the first data type. The first database may include data of the first data type, such as a first data, and the second database may include data of the second data type, such as a second data.

For example, the first database may include an object database and the second database include a high-scale time series database. The data (object data) in the object database may represent an entity while the data (time series/temporal data) in the high-scale time series database may represent some characteristics, such as geo-temporal information, associated with the entity. The object database may store data representing other low-scale, high-level objects while the high-scale time series database may store data representing other high-scale, low-level objects. Access of other disparate databases, such as relational databases, hierarchical databases, and/or other databases, by the database engine 114 are contemplated. For example, the first database accessed by the database engine 114 may include an object database and the second database accessed by the database engine 114 may include a relational database. In such a case, one or more of the functions described herein with respect to the high-scale time series database may be provided by the relational database. Other combinations of disparate databases may be accessed and used.

An object database may include objects representing entities, links between objects that represent connections between the corresponding entities, and/or other information relating to entities. An entity may refer to a thing that has a separate and distinct existence. An entity may include a living thing and/or a non-living thing. An entity may include a physical thing and/or a virtual thing. For example, an entity may refer to individual or groups of persons, things, organizations, occurrences, events, and/or documents. Other types of entities are contemplated. Connections between entities may include definite connections and/or potential connections. Connections between entities may include user-defined connections. For example, a connection between two entities may exist based on a user linking the two entities. Connections between entities may include suggested connections. For example, a connection between two entities may be suggested by a computing device and/or a user based on an analysis of information relating to the entities.

Data in a high-scale time series database may be descriptive of one or more features of an entity/link represented by an object data in the object database. For example, high-scale time series/temporal data may include geo-temporal information defining geographic locations of an entity at different times. For instance, a high-scale time series database may include one or more tables that represent locations of a person and/or a device associated with the person. By way of example, a high-scale time series database may include one or more tables of information relating to locations of the person at a particular time inputted manually or by a computing device (e.g., camera), locations of a device carried by the person (e.g., GPS information), interpolated locations of the person/device (e.g., locations between manually inputted locations, locations of device between GPS pings), projected locations of the person/device (e.g., locations of persons/device projected into future and/or time duration during which physical observations/GPS pings are not available), locations of the person/device extracted from other information/sources (e.g., location of a persons determined from other documentation relating to the person, locations of a person determined from interview with the person or other persons) and/or other locations of the person/device. Various location information may be generated at the same or different rates. For instance, location information from physical observations of a person may be generated at a lower rate than location information from GPS of a device carried by the person. The high-scale time series database may include temporal data descriptive of other feature(s) of an entity/link.

In some embodiments, one or more machine learning tools and/or models may use data (e.g., in the high-scale database) to identify potential connections between objects in the object database. That is, the machine learning tool(s)/model(s) may suggest links for objects in the object database. These potential connections may be suggested to a user for investigation. The user's confirmation/rejection of the suggested connections may be fed back into the machine learning tool to update and refine the machine learning tool. Such a feedback loop may improve the fidelity of information extracted from the databases, which may be combined as inputs into the machine learning tool and/or model.

For example, a user may use an object-oriented application (e.g., web application) to generate data in the object database that represents connections between different entities. These user-generated data may be used as seeds from which potential connections may be outputted by a machine learning tool. That is, the existing connections between entities may be used to train a machine learning tool/model and additional information about different entities that are stored in the high-scale time series database may be used by the machine learning tool/model to suggest other connections between the entities. For example, the machine learning tool/model may suggest that a particular entity may be connected to another entity (e.g., a phone may belong to/be used by a person, two persons may have met at a particular location/time). The machine learning tool/model may be trained as data becomes available. For instance, the machine learning tool/model may be trained based on existing connection between entities, and may be updated based on new connections between entities, removal of connections between entities, and/or changes in connections between entities. For instance, a user confirmation of a connection suggested by the machine learning tool/model may be used as a positive case to train the machine learning tool/model while a user rejection of a connection suggested by the machine learning tool/model may be used as a negative case to train the machine learning tool/model.

Storage of high-scale, low-level data (e.g., generated at a high rate, such as GPS pings generated/transmitted/received per second) in the object database may cause a strain on the object database and/or a computer device/application using the object database. High-scale, low-level data may also be tightly related to preceding and/or subsequent low-level data. For example, high-scale, low-level data of geo-temporal information may include information defining geographic locations of an entity at different times. The geographic location of the entity at a particular time may be tightly related to a prior location of the entity at a prior time and/or a subsequent location of the entity at a subsequent time. The object database and/or a computing device/application using the object database may not be structured to efficiently handle such high-scale, low level objects. Rather, a high-scale time series database and/or a computing device/application using the high-scale time series database may be structured to efficiently handle such high-scale, low level objects.

The object database and/or a computing device/application using the object database may be structured to efficiently handle low-scale, high level objects, such as objects representing persons, things, organizations, documents, unique/non-repeating occurrences/events, and/or occurrences/events that occur at a low rate. The object database and/or the computing device/application using the object database may be configured to provide a unified view of the objects in the object database. For example, objects stored in the object database may be indexed, searched, loaded, viewed, modified, and/or shared using one or more application that provides a unified perspective of the objects. However, because the object database and/or the computing device/application using the object database is configured for low-scale, high level objects, including high-scale, low level objects in such object database and/or processing of high-scale, low level objects by such computing device/application may result in high costs in terms of memory footprint, data usage, processing power/time, and/or other operations of the object database and/or the computing device/application.

The high-scale time series database and/or a computing device/application using the high-scale time series database may be structured to efficiently handle high-scale, low level objects, such as geo-temporal information of an object that is generated at high rate. The high-scale time series database and/or the computing device/application using the high-scale time series database may perform operations on high-scale data as the high-scale data flows into the high-scale time series database/computing device/application. The high-scale time series database and/or the computing device/application using the high-scale time series database may be configured to run arbitrary logic on data (e.g., temporal data, relational data). For example, various arbitrary logic may be run on high-scale data to generate ontological events with some sort of probability. The high-scale time series database and/or the computing device/application using the high-scale time series database may be configured to run one or more algorithms to explore characteristics (e.g., links) between objects in the object database.

For example, one or more portions of high-scale data in the high-scale time series database may be used to determine whether two or more entities represented by objects in the object database were located at the same location at the same time (e.g., meeting detection). For instance, geo-temporal information (e.g., cellular tower pings for a mobile device of an entity, physical observations of entity locations, projected locations of an entity) associated with different objects/entities may be compared to determine when different objects/entities were/may be near each other. As another example, one or more portions of data in the high-scale time series database may be used to determine where an entity represented by an object in the object database was located at particular time (e.g., determining where a person was in the morning/afternoon/night, at specific time), whether an entity represented by an object in the object database was located at a particular area within a range of time (e.g., determine whether a person was in an area during a given period of time), and/or when certain the entity arrived at/departed from a particular location (e.g., determining when a person arrived at/departed from home and/or an event). As yet another example, one or more portions of data in the high-scale time series database may be used to determine whether an entity represented by an object in the object database is related to another entity represented by another object in the object database (e.g., determining which mobile device belongs to which person). Other exploration of entities of objects/entities based on data in high-scale time series database are contemplated.

In some implementations, the high-scale time series database may be used for data transformation and/or data enrichment. For instance, data in the high-scale time series database may be modified using transformations/pipeline tools, such as to merge, clean, normalize, interpolate, extrapolate, and/or otherwise transform the data (e.g., data in different data set) to provide data for use. Data in the high-scale time series database may be used to enrich an object in the object database. For example, data associated with an object in the object database may be used to augment one or more views and/or analysis of the object. As another example, data in the high-scale time series database may not be associated with the object, but may be used to enrich data associated with the object. For example, the high-scale time series database may include data specific to (associated with) a device used by a person. The device and/or the person may be represented by one or more objects in the object database. The high-scale time series database may include data that include other information about the device, such as information general to the device (e.g., device specification). Such information may be used to enrich the data specific to the device and/or the object representing the person. As yet another example, the one or more decorator operations may be run to find information relating to the temporal data/object data (e.g., determining longitude and latitude of a building based on an address of the building, finding media items, such as pictures, videos, audios, associated with a person or a thing).

By splitting different types of data between the object database and the high-scale time series database (e.g., separate storage of object data representing a person from temporal data representing GPS sensor data of a device carried by the person), the computing system 102 may take advantage of the configuration (e.g., optimization) of different databases for different types of data.

In various embodiments, the request engine 116 may be configured to receive one or more information requests relating to data in different databases. For example, the request engine 116 may receive an information request relating to an object data stored in an object database, an information request relating to high-scale data stored in a high-scale time series database, and/or other data stored in other databases. The request engine 116 may receive, for example, an information request from a user of the computing system 102, a portion (e.g., another engine and/or component of the computing system 102) of the computing system, a user of a computing device communicating with the computing system 102 (e.g., via a network), and/or a computing device communicating with the computing system. An information request relating to a portion of data may specify the data, be directed to the data, and/or otherwise be related to the data. For example, an information request relating to an object data representing an entity by may specify the object data/entity, be directed to the object data/entity, and/or otherwise be related to the object data/entity. Other arrangements/structures of information requests are contemplated.

In some embodiments, an information request for an area may be received through a user interface. The user interface may include one or more options by which a user may select a particular object for which information required is related. For example, the user interface may display a map of a geographic area and may include options that enable a user to select particular entities within the geographic area and/or particular entity features for which information/operation is desired. As another example, the user interface may display a graph of links between entities and may include options that enable a user to select a particular entity and/or links for which information/operation is desired. The user interface may include one or more options by which a user may specify the extent, the amount, and/or the level of information desired. For example, the user interface displaying a map may include options that enable a user to select/change the location displayed within the map (e.g., via panning, zooming) and/or to select/change one or more areas within the location for which information is desired. The user interface displaying a graph may include options that enable a user to select/change the types of entities displayed within the graph (e.g., displaying only person entities or displaying both person entities and linking entities, such as events, accounts, and/or things, by which persons are linked) and/or to select/change the level of details regarding the entities/links are displayed (e.g., displaying of additional information relating to an entity/link, such as more detailed information or source of the information, based on hovering over the entity/link with a cursor).

In various embodiments, the response engine 118 may be configured to determine one or more responses to information request(s). The response engine 118 may determine response(s) to information request(s) received by the request engine 116. The response engine 118 may determine a response to an information request relating to data in one database based on associated data in another database. Data included in different databases may be tightly integrated such that information request/flow may move from data in one database to data in another database. For example, temporal data in a high-scale time series database may be associated with an object data in the object database such that responsive to receiving an information requesting to the object data, the response engine 118 may determine a response based on the temporal data and/or other information, and responsive to receiving an information requesting to the temporal data, the response engine 118 may determine a response based on the object data and/or other information. For example, the object data may represent a person carrying a location sensor (e.g., GPS device), and the temporal data may represent location data generated by the location sensor (e.g., GPS data). Based on an information request relating to location of the person (e.g., request for information identifying locations of the person within a time period and/or a geographic area), the response engine 118 may determine the response to the request by using the associated location data stored in the high-scale time series database. As another example, based on an information request that prompts search of GPS data of multiple location sensor for indications that particular GPS device/person associated with the GPS device was located in a geographic area, the response engine 118 determine the response to the request by using the associated object data (e.g., object data representing GPS device, person) stored in the object database. That is, rather than returning GPS pings recorded within the geographic area, the response engine 118 may return entities (e.g., GPS device, person) that is associated with GPS pings recorded within the geographic area. Other types of requests and responses to requests are contemplated.

In various embodiments, the interface engine 120 may be configured to provide one or more interfaces through which response(s) to information request(s) are accessible. For example, the interface engine 120 may provide an interface through which one or more responses (e.g., response to information request(s) relating to a temporal data and/or an object data) determined by the response engine 118 are accessible. The interface(s) may include application programming interface(s) and/or user interface(s) through which response(s) are accessible. For example, the interface engine 120 may provide one or more APIs that may be used by users/computing devices to view and/or request information/operations relating to a temporal data and/or an object data. As another example, the interface engine 120 may provide one or more user interfaces (e.g., web user interface) through which users/computing devices may enter/select/provide commands to view and/or request information/operations relating to a temporal data and/or an object data. Provision of other access to temporal data, object data, responses to information requests relating to temporal data and/or object data are contemplated.

In some embodiments, the interface(s) provided by the interface engine 120 may provide a merged view of data in different (disparate) databases. A merged view may refer to a view of multiples types of data in a unified format. Such an interface may facilitate similar treatment of different types of data. For instance, the interface may provide a merged view of different types of geo-temporal data (e.g., cellular tower pings for a mobile device of an entity, physical observations of entity locations, projected locations of an entity) using the same type of tool(s) (e.g., time scrubber, detail bar, map zoom), which may provide a consistent user interface that fuses different descriptive data of different sources for an entity at the application level. For example, data from different data sources may be merged into the same data format for performing operations. An operation for the entity, such as a meeting detection operation to determine if the entity met with another entity or a location detection operation to determine if the entity was at a particular location, may treat the different geo-temporal data as location data for the entity even though the different data may have been generated differently and/or may be stored differently (e.g., in different format, in different databases). As another example, one or more data may be retrieved from cold data storage and hydration of such data pull the data as a native part of the ontology.

Such an interface may enable users/computing devices to treat different types of data (e.g., different types of geo-temporal data, data in different databases) similarly. For example, data including geo-temporal information may be tied to object data representing an entity such that an ontological interface may be provided for various operations (e.g., queries, searches, loads, views, modifications) on the data. For instance, in response to a load request for an object data representing a person, transformations and/or data pipeline tools may be used to enrich the object data with arbitrary ontological events, such as events involving the person, devices/documents/accounts used by the person, and/or other information relating to the person.

These operations may be performed in a pipeline layer by the application/in the database structured to efficiently handle the relevant data, such as the application/database structured to handle high-scale, low level objects or the application/database structured to handle low-scale, high level objects. When a data is requested to be loaded from a particular database, such as an object database, an associated data in a different database, such as a high-scale time series database, may be implicitly loaded as well.

In some embodiments, the interface(s) provided by the interface engine 120 may provide for simplification of data operations. Rather than running data operations on entire data stored in databases, simplification operations may be used to reduce the size of the data on which operations are run. For example, data may include geo-temporal information and geographic information system algorithm may be run to generate reduced (e.g., minimal) representation of the data. For instance, one or more of geographic and/or temporal zoom may be used to select a portion/slice of data to be operation on. That is, the data may be scaled back and/or interpolated to additional operations and/or viewing through an interface. Standard downsampling and line simplification techniques may be used to improve performance of data operations.

Figure 2:
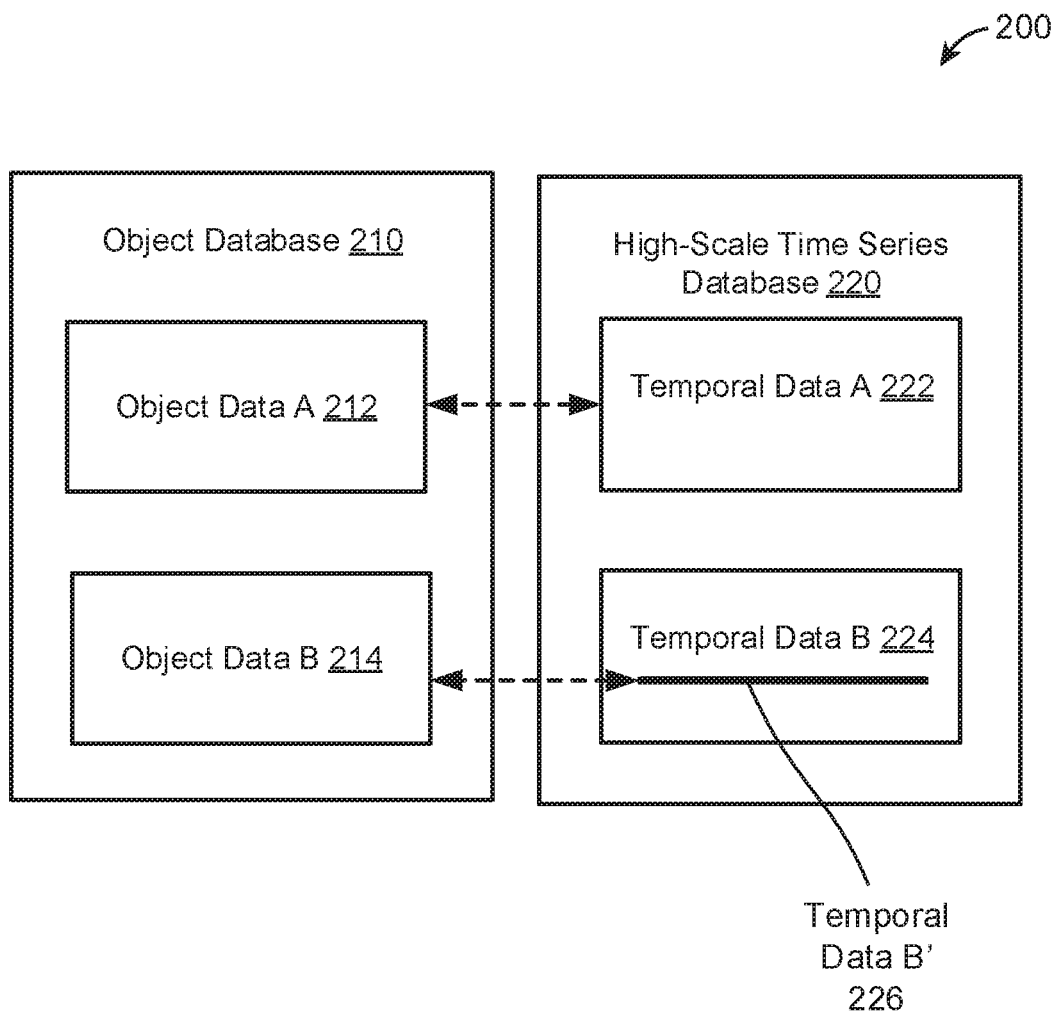
FIG. 2 illustrates example databases, in accordance with various embodiments.

FIG. 2 illustrates example databases 200, in accordance with various embodiments. The databases 200 may include an object database 210 and a high-scale time series database 220. The object database 220 may include an object data A 212 and an object data B 214. The object data A 212 may present an entity and the object data B 214 may present another entity. The high-scale time series database 220 may include a temporal data A 222 and a temporal data B 224. The temporal data A 222 may be associated with the object data A 212. For example, the object data A 212 may correspond to a sensor device (e.g., GPS device) and the temporal data A 222 may include geo-temporal information representing locations of the sensor device (e.g., GPS data) at different times. A portion of the temporal data B 224 (a temporal data B' 226) may be associated with the object data B 214. For example, the object data B 214 may represent a person and the temporal data B' 226 may include geo-temporal information representing locations of the person. The geo-temporal information may have been generated based on one or more of sensor readings associated with the person (e.g., cellular tower pings for a mobile device of the person), physical observations of person's locations, projected locations of the person, and/or other information. The temporal data B 224 may include geo-temporal information representing locations of other entities and/or non-geo-temporal information relating to the person and/or other entities.

Data 212, 214, 222, 226 included in the databases 210, 220 may be tightly integrated such that information request/flow may move from data in one database to data in another database. For example, the temporal data A 222 in the high-scale time series database 220 may be associated with the object data A 212 in the object database 210 such that a response to an information requesting to the object data A 212 may be determined based on the temporal data A 222, and a response to an information requesting to the temporal data A 222 may be determined based on the object data A 212.

Figure 3:
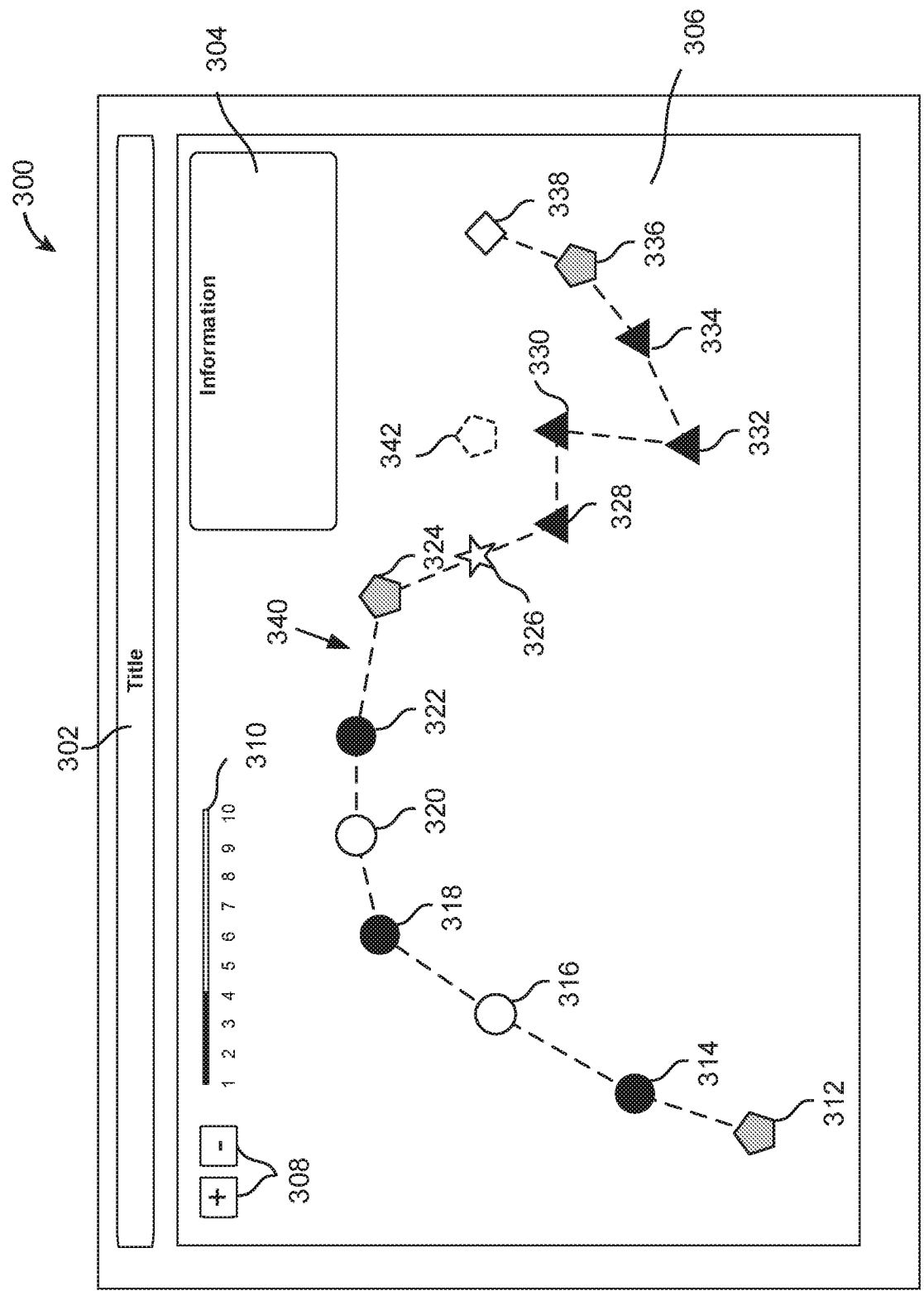
FIG. 3 illustrates an example interface for presenting geo-temporal data, in accordance with various embodiments.

FIG. 3 illustrates an example interface 300 for presenting geo-temporal data, in accordance with various embodiments. In various embodiments, the interface 300 may be accessed through a software application running on a computing device (e.g., computers, mobile phones, tablets, etc.) that includes one or more processors and memory. For example, the interface 300 may be accessible through a web browser. In another example, the interface 300 may be provided through a data analysis application. In yet another example, the interface 300 may be provided as a service over a network (e.g., software as a service). Depending on the computing device, the user may be able to interact with the interface 300 using various input devices (e.g., keyboard, mouse, etc.) and/or touch gestures. The interface 300 is provided merely as an example and, naturally, the arrangement and configuration of such user interfaces can vary depending on the implementation. Thus, depending on the implementation, the interface 300 may include additional features and/or alternative features.

The interface 300 may include a title section 302, an information section 304, and a view section 306. The title section 302 may provide information relating to views presented in the view section 306. For example, the title section 302 may provide title and/or other information relating to objects of which information are presented in the view section. The information section 304 may provide information relating to views presented in the view section 306. The view section 306 may provide a visualization of information relating to one or more entities, such as a display of geo-temporal locations of a person, and the information section 304 may provide information relating to the person, locations, times, and/or other parameters related to the information presented in the view section. The interface 300 may include options 308, which may enable a user to change the level of zoom (e.g., geo-zoom, temporal-zoom) used to present information within the view section 306. The interface 300 may include an option 310, which may enable a user to change the level, type, and/or particular information presented within the view section 306. For example, the option 310 may enable a user to change the amount of details (e.g., number of locations, details relating to individual locations) presented within the view section 306. The option 310 may enable a user to change the grouping of information by which views of information within the view section 306 are determined, such as grouping of different geo-temporal information as location information for the person. The option 310 may enable a user to change the type of analysis performed for the information presented within the view section 306, such as the type of and/or extent of interpolated/projected locations of the person shown within the view section. Other interactions of the user with the interface 300 are contemplated.

The view section 306 may provide a visualization of information relating to one or more entities. For example, as shown in FIG. 3, the view section 306 may provide a visualization of geo-temporal locations of an entity, such as a person. The visualization may include a display of a route 340 of the entity determined based on different types of geo-temporal information. For example, the route 340 may include locations 312, 314, 316, 318, 320, 322, 324, 326, 328, 330, 332, 334, 336, 338 of the entity at different times. Other types of visualization (e.g., raster, probability distribution) are contemplated.

The visualization shown in the view section 306 may be displayed in response to one or more information request relating to the entity. For example, in response to a request to see locations of a person on a map, observations of the person's locations may be displayed in the view section 306. In response to the request, different streams of data associated with the person and including location information of the person may be obtained and merged for display in the view section 306. For instance, the locations 312, 324, 336 may correspond to locations of the person manually inputted (e.g., by another person) or by computing device. The locations 314, 318, 322 may correspond to locations of the person determined based on a sensor (e.g., location sensor, such as a GPS device) generating information that characterizes the location of the person. The locations 328, 330, 332, 334 may correspond to locations of the person extracted from other information/sources.

The locations 316, 320, 326 may correspond to interpolated locations of the person. Interpolated locations of the person may refer to calculated locations of the person between observed locations of the person. For example, locations of the person may be interpolated based on observed locations of the person and information relating to the movement of the person at the observed locations, such as the person's heading, velocity, and acceleration. The locations 316 320 may be interpolated based on one data stream of location information for the person, such as based on the locations 314, 318, 322. The location 326 may be interpolated based on multiple data streams of location information for the person, such as based on the locations 324, 328. Using multiple data streams of location information (e.g., different types of location data) to interpolate the person's locations may result in more accurate position determinations. For example, interpolating the person's location simply from physical observations of the person (the locations 324, 336) may result in a location 342, which may be far from actual locations of the person at the time corresponding to the interpolated location 342. Different streams of data may be weighed the same or weighed differently for location interpolation. For instance, one stream of data that has greater location accuracy may impact the interpolation of location more than another stream of data.

The location 338 may correspond to a projected location of the person. Projected locations of the person may refer to calculated locations of the person beyond the time frame during which the locations of the person were observed (e.g., future location). For example, locations of the person may be calculated based on observed locations of the person and information relating to the movement of the person at the observed locations, such as the person's heading, velocity, and acceleration. The location 338 may be projected based on multiple data streams of location information for the person, such as based on the locations 332, 334, 336. Using multiple data streams of location information (e.g., different types of location data) to project the person's locations may result in more accurate position determinations. For example, projecting the person's location simply from physical observations of the person (the locations 324, 326) may result in a location below and to the right of the location 336. Different streams of data may be weighed the same or weighed differently for location projection. For instance, one stream of data that has greater location accuracy may impact the projection of location more than another stream of data.

The visualization displayed in the view section 306 (e.g., the route 340, the locations 312, 314, 316, 318, 320, 322, 324, 326, 328, 330, 332, 334, 336, 338) may change based on a user's interaction with the interface 300. For instance, a user may have interacted with the options 308 to change the level of zoom (e.g., amount of detail) for the information presented within the interface 300 and/or the option 310 to change the type of information presented within the interface 300. Portions of the multiple streams of data (including location information of the person) corresponding to the level of zoom/type of information selected by the user may be retrieved to hydrate the interface 300. That is, only the persons of the data streams relevant to the selected viewing option may be retrieved for processing and display, rather than retrieving and processing entirety of the data streams. That is the geo-temporal data of the person may be simplified based on the use of the options 308, 310.

A user may use the visualization displayed in the view section 306 (e.g., the route 340, the locations 312, 314, 316, 318, 320, 322, 324, 326, 328, 330, 332, 334, 336, 338) to see additional information relating to the person. For instance, based on the user clicking on the location 322, the user may see additional information relating to the person at the location 322 (e.g., the person's heading, velocity, and acceleration at the location 322, the person's status/activity at the location 322) and/or additional information relating to how the location 322 was determined (e.g., sensor type, sensor identifier, sensor reading). Based on the user hovering over a point on the route 340 (e.g., with a mouse cursor), information relating to the location corresponding to the point may be displayed. For instance, the visualization may be displayed in the view section 306 using down-sampled information (e.g., based on a user's interaction with the options 308, 310). Based on the user's request for information relating to a specific point on the route 340, information for the corresponding location may be retrieved from back-end to provide specific (e.g., less-down-sampled, non-down-sampled) information for the location. Other uses of the visualization are contemplated.

Different locations of the person corresponding to different streams of data may be presented differently within the view section 306. For example, the color and/or the shape of how the locations 312, 314, 316, 318, 320, 322, 324, 326, 328, 330, 332, 334, 336, 338 are presented in the view section 306 may be changed to inform a user that the location is provided based on different sensor and/or different calculation. Such presentation of information may facilitate the user to match and explore different theories relating to the person.

Figure 4A:
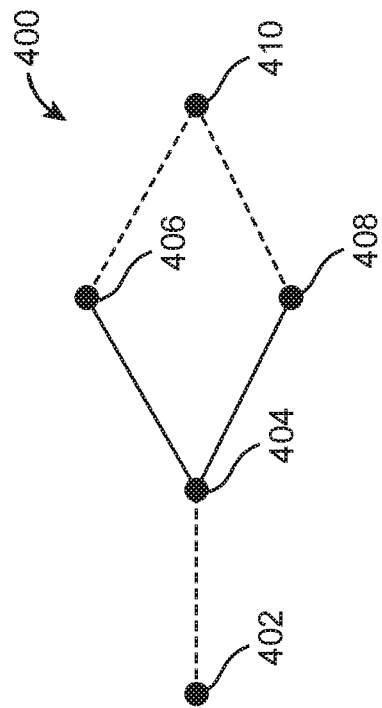
FIG. 4A illustrates an example graph of objects, in accordance with various embodiments.

FIG. 4A illustrates an example graph of objects 400, in accordance with various embodiments. The graph 400 may include nodes 402, 404, 406, 408, 410 representing entities. For example, the nodes 402, 404, 406, 408, 410 may represent different persons. The links between the nodes 402, 404, 406, 408, 410 may represent connection between the entities represented by the nodes 402, 404, 406, 408, 410. Connections between the entities may include user-defined connections, represented by solid lines. For example, the link between the nodes 404, 406 and the link between the nodes 404, 408 may represent connections between the corresponding persons established based on a user linking the persons. That is, a user may manually establish/confirm that the corresponding persons are related/connected to each other in some way. Connections between the entities may include suggested connections, represented by dashed lines. For example, the link between the nodes 402, 404, the link between the nodes 406, 410, and the link between the nodes 408, 410 may represent potential connections between the corresponding persons suggested based on an analysis of information relating to the persons. For example, the persons may be stored as object data in an object database and information relating to the person may be stored as temporal data in a high-scale time series database. The data in the high-scale time series database may be explored to find potential connections between the persons. For example, a machine learning tool (or model) may receive data from the high-scale time series database to identify potential connections between objects representing persons in the object database. A user's confirmation/rejection of the suggested connections may be fed back into the machine learning tool to update and refine the machine learning tool.

Figure 4B:
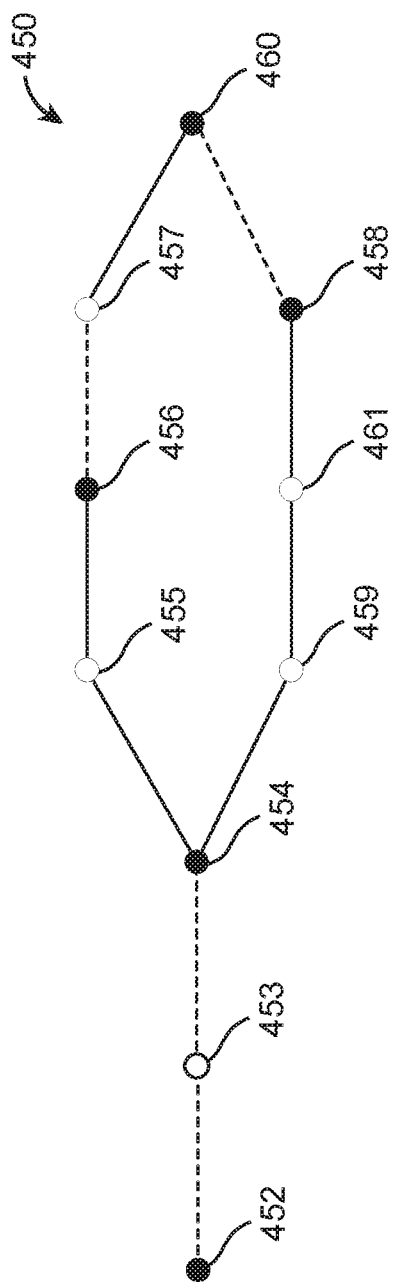
FIG. 4B illustrates another example graph of objects, in accordance with various embodiments.

FIG. 4B illustrates another example graph of objects 450, in accordance with various embodiments. The graph 450 may include nodes 452, 454, 456, 458, 460 representing entities. For example, the nodes 452, 454, 456, 458, 460 may represent different persons. The graph 450 may include nodes 453, 455, 457, 459, 461 representing linking entities. Link entities may refer to entities that link other entities together. For example, a linking entity may include an account and entities linked by this account may include those persons that are known to use the account. As another example, a linking entity may include an event and the entities linked by this event may include those persons that attended the event. As another example, two persons may be connected by linking entities including mobile phones, SIM cards, cellular power pings, locations, and/or events. Other types of linking entities are contemplated.

The links between the nodes 452, 453, 454, 455, 456, 457, 458, 459, 460, 461 may represent connection between the entities represented by the nodes 452, 453, 454, 455, 456, 457, 458, 459, 460, 461. Connections between the entities may include user-defined connections, represented by solid lines. For example, the link between the nodes 454, 455 and the link between the nodes 459, 461 may represent connections between the corresponding persons/linking entities established based on a user linking the persons/linking entities. That is, a user may manually establish/confirm that the corresponding persons/linking entities are related/connected to each other in some way. Connections between the entities may include suggested connections, represented by solid lines. For example, the link between the nodes 456, 457 and the link between the nodes 458, 460 may represent potential connections between the corresponding persons/linking entities suggested based on an analysis of information relating to the persons/linking entities.

For example, connections between the persons represented by the nodes 452, 454 may include two suggested connections: one between the person represented by the node 452 and a linking entity represented by the node 453, and another between the person represented by the node 454 and the linking entity represented by the node 453. Connections between the persons represented by the nodes 454, 458 may include three user-defined connections: one between the person represented by the node 454 and a linking entity represented by the node 459, one between the linking entity represented by the node 459 and another linking entity represented by the node 461, and one between the linking entity represented by the node 461 and the person represented by the node 458. Connections between persons may include both suggested connections and user-defined connections, such as between the persons represented by the nodes 456, 460.

The nodes/links in the graph 450 may be associated with temporal information. For example, if a user is interested in interactions occurring at particular time/duration of time, the nodes/links in the graph corresponding to events occurring at the particular time/duration of time may be displayed different from other nodes/linked (e.g., highlighted, not greyed out). As another example, when a user has selected a node representing an event in the graph 450, information relating to the preceding event and/or the subsequent event may be displayed in the graph 450. As yet another example, links between the nodes in the graph 450 may be displayed differently (e.g., in different color, using different styles of line) to display directionality of the connection (e.g., who engaged whom) and/or the temporality of the connections (e.g., which connections were established earlier, later).

Figure 5:
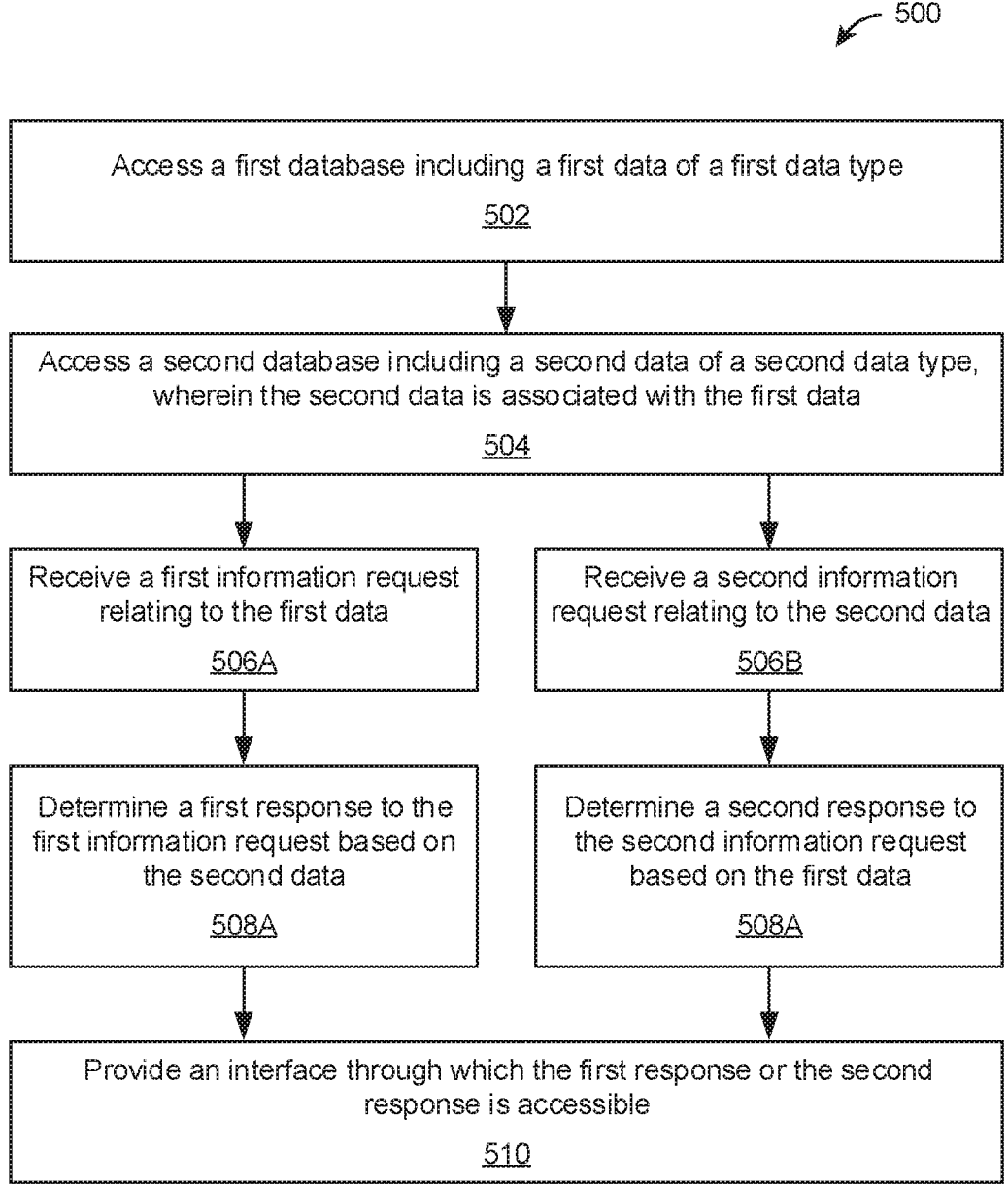
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, a first database including a first data of a first data type may be accessed. At block 504, a second database including a second data of a second data type may be accessed. The second data may be associated with the first data. At block 506A, a first information request relating to the first data may be received. At block 506B, a second information request relating to the second data may be received. At block 508A, a first response to the first information request may be determined based on the second data. At block 508B, a second response to the second information request may be determined based on the first data. At block 510, an interface, through which the first response or the second response is accessible, may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
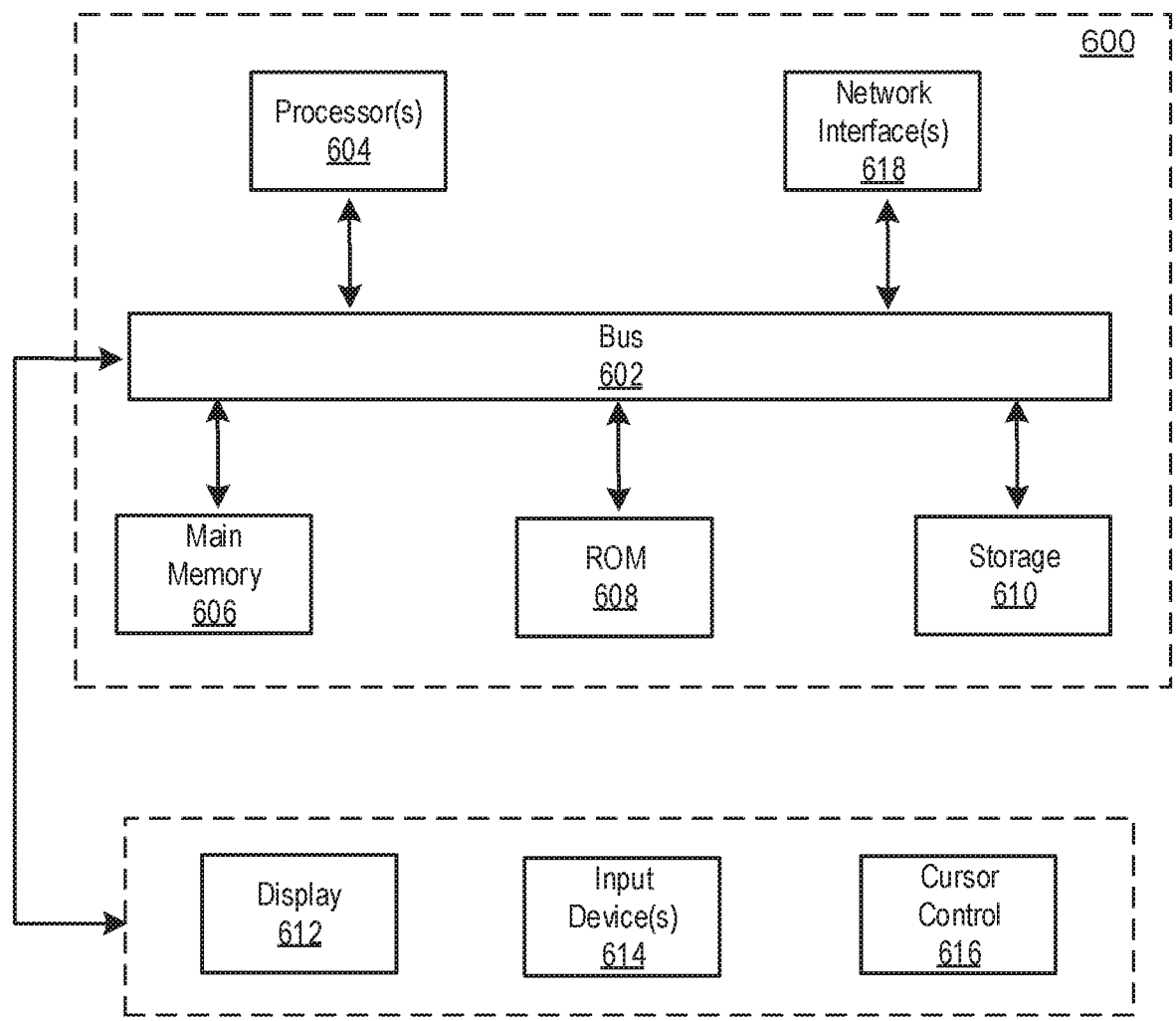
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a high-scale time series database, relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
storing first data of a first data type in a first database that is structured for the first data type, the first data representing a plurality of entities, the first database being associated with a first ontology;
storing second data of a second data type different from the first data type in second databases that are structured for the second data type, wherein the second data comprises spatial and temporal attributes of the plurality of entities, and a second database is associated with a second ontology different from the first ontology;
obtaining updated second data from data sources;
modifying the second data in the second databases based on the updated second data;
weighting the second data, the updated second data or the modified second data based on accuracy levels of the data sources from which the second data or the updated second data is obtained;
in response to a query that loads first entity data of the first data, wherein the first entity data comprises a first subset of the first data relevant to the query, automatically loading second entity data of the second data, wherein the second entity data comprises a second subset of the second data, the updated second data, or the modified second data that corresponds to the first entity data;
interpolating the second entity data based on the weighting of the second data, the updated second data or the modified second data;
in response to interpolating the second entity data; receiving, from an object-oriented application, connections between two or more of the plurality of entities;
inputting the connections into a machine learning tool;
determining, by the machine learning tool according to the connections and according to generated ontological events with probabilities, additional connections among the plurality of entities based on the interpolated second entity data, wherein the generated ontological events enrich the first data and comprise common characteristics or relationships among the entities and are according to the second ontology; and
providing a merged view displaying the connections and the additional connections among the plurality of entities.

2. The system of claim 1, wherein the object-oriented application comprises a web application; and the providing of the merged view comprises indicating respective directionalities of the connections and the additional connections and indicating respective temporalities of the connections and the additional connections.

3. The system of claim 1, wherein the determining of the additional connections among the plurality of entities comprises:
detecting a potential connection between a first and a second entity based on the connections between the two or more of the plurality of entities;
displaying the potential connection; and
in response to receiving a confirmation or a rejection of the potential connection, updating the machine learning tool.

4. The system of claim 1, wherein the determining of the additional connections among the plurality of entities comprises:
updating one of the connections based on the additional connections, wherein the updating comprises removing or changing at least a subset of the connections.

5. The system of claim 1, wherein
the modified second data is being continuously generated and stored in the second database, and the instructions that, when executed by the one or more processors, cause the system to perform:
updating the machine learning tool as the modified second data becomes available.

6. The system of claim 1, the instructions that, when executed by the one or more processors, cause the system to perform:
storing the connections into the first database.

7. The system of claim 1, wherein the merged view displays the connections and the additional connections using different types of lines.

8. The system of claim 1, wherein a first rate of generation of the first data is lower than a second rate of generation of the second data.

9. The system of claim 8, wherein the instructions that, when executed by the one or more processors, cause the system to perform:
storing the interpolated second entity data in the second database as part of the second data.

10. The system of claim 1, wherein the instructions that, when executed by the one or more processors, cause the system to perform:
performing data projection based on the second data to generate new spatial and temporal attribute data;
the determination of the additional connections is based on
the newly generated spatial and temporal attribute data and the second data.

11. The system of claim 1, wherein the providing of the merged view comprises:
using a first icon type, displaying first location information of an entity within the plurality of entities from a first source;
using a second icon type, displaying second location information of the entity from a second source; and
using a third icon type, displaying third location information of the entity based on interpolation of the first location information and the second location information.

12. A method implemented by one or more hardware processors, the method comprising:
storing first data of a first data type in a first database that is structured for the first data type, the first data representing a plurality of entities, the first database being associated with a first ontology;
storing second data of a second data type different from the first data type in second databases that are structured for the second data type, wherein the second data comprises spatial and temporal attributes of the plurality of entities, and a second database is associated with a second ontology different from the first ontology;

obtaining updated second data from data sources;

modifying the second data in the second databases based on the updated second data;

weighting the second data, the updated second data or the modified second data based on accuracy levels of the data sources from which the second data or the updated second data is obtained;

in response to a query that loads first entity data of the first data, wherein the first entity data comprises a first subset of the first data relevant to the query, automatically loading second entity data of the second data, wherein the second entity data comprises a second subset of the second data, the updated second data, or the modified second data that corresponds to the first entity data;

interpolating the second entity data based on the weighting of the second data, the updated second data or the modified second data;

in response to interpolating the second entity data; receiving, from an object-oriented application, connections between two or more of the plurality of entities;

inputting the connections into a machine learning tool;

determining, by the machine learning tool according to the connections and according to generated ontological events with probabilities, additional connections among the plurality of entities based on the interpolated second entity data, wherein the generated ontological events enrich the first data and comprise common characteristics or relationships among the entities and are according to the second ontology; and providing a merged view displaying the connections and the additional connections among the plurality of entities.

13. The method of claim 12, wherein the object-oriented application comprises a web application; and the providing of the merged view comprises indicating respective directionalities of the connections and the additional connections and indicating respective temporalities of the connections and the additional connections.

14. The method of claim 12, wherein the determining of the additional connections among the plurality of entities comprises:

detecting a potential connection between a first and a second entity based on the connections between the two or more of the plurality of entities;

displaying the potential connection; and in response to receiving a confirmation or a rejection of the potential connection, updating the machine learning tool.

15. The system of claim 1, wherein the providing a merged view comprises providing a window that displays the connections in a different manner from the additional connections, the connections and the additional connections being selectable to display related contextual data at a higher level of granularity.

16. The system of claim 1, wherein the instructions that, when executed by the one or more processors, cause the system to perform:

displaying, on the merged view, a media file comprising multiple streams of data, the media file depicting one or more entities corresponding to the query and removing other entities irrelevant to the query.

* * * * *